United States Patent Office 2,853,528
Patented Sept. 23, 1958

2,853,528

ALPHA,BETA,BETA'-TRICHLORODIETHYL ETHER

Bruno H. Wojcik, Niagara Falls, N. Y., assignor to Olin Mathieson Chemical Corporation, a corporation of Virginia No Drawing. Application January 8, 1953
Serial No. 330,351

2 Claims. (Cl. 260—614)

This invention relates to production of a new composition of matter which may be identified as alpha, beta, beta'-trichlorodiethyl ether. The new product has the formula $CH_2ClCHClOCH_2CH_2Cl$.

The new product of this invention can be prepared by chlorination of beta, beta'-dichlorodiethyl ether either with or without the presence of ultra violet light. The crude chlorination product is fractionally distilled to obtain alpha, beta, beta'-trichlorodiethyl ether having a boiling point of about 85.5° C. at 13 mm. of mercury, a refractive index ($N_D^{25}$) of about 1.479, a density ($D_4^{27}$) of about 1.3588, a theoretical molecular refraction of 37.05 and a theoretical chlorine content of 59.93 percent.

Although the chlorination of beta, beta'-dichlorodiethyl ether may be conducted at temperatures up to about 150° C. to produce alpha, beta, beta'-trichlorodiethyl ether, I have found that by conducting the chlorination at temperatures between about 10° and 50° C. I have been able to obtain an unexpected and advantageous product distribution. At temperatures below about 10° C. the chlorination is very slow, but in the range of 10° to 50° C. the chlorination proceeds at a satisfactory rate and the product distribution is unusually sharp in favor of alpha, beta, beta'-trichlorodiethyl ether. In most chlorination operations considerable proportions of higher chlorination products than the desired product form before all of the lower chlorination products disappear. Consequently, the resulting product mixture contains less of the desired product and more higher and/or lower chlorination products. I have found however that by maintaining the chlorination temperature within the specified range dichlorodiethyl ether can be substantially completely and selectively converted to trichlorodiethyl ether before any tetrachloro or higher chlorinated compound begins to form to any appreciable extent. For maximum yield and conversion the dichlorodiethyl ether should be reacted at a temperature between about 10° and 50° C. with an approximately stoichiometric quantity of chlorine, i. e., approximately one mole of chlorine per mole of dichlorodiethyl ether. In the reaction between chlorine and the dichlorodiethyl ether to form the trichlorodiethyl ether, one atom of chlorine is introduced into each molecule of the dichlorodiethyl ether and one atom of chlorine combines with the atom of hydrogen released and leaves the reaction as hydrogen chloride. While excellent yields may be obtained if less than the stoichiometric quantity of chlorine is reacted with the dichlorodiethyl ether, unreacted dichlorodiethyl ether will then be present in the product and must be separated and recycled to obtain complete conversion to the trichlorodiethyl ether.

The new product is useful as a catalyst in the polymerization of furfuryl alcohol and as a chemical intermediate, e. g., in the production of chloroacetals. It also has value as a soil fumigant and for slime or mold control.

The following examples will illustrate the preparation of the new product of this invention:

Example I

Beta, beta'-dichlorodiethyl ether was chlorinated at temperatures below 50° C. to form alpha, beta, beta'-trichlorodiethyl ether by passing chlorine into the liquid dichlorodiethyl ether until slightly more than 1 mole of chlorine per mole of dichlorodiethyl ether had been added. The resulting product was purified by vacuum distillation and boiled at 85.5° C. at 13 mm. of mercury.

Example II

Chlorine was passed into liquid beta, beta'-dichlorodiethyl ether at a rate of 0.75 mole per hour in the presence of ultra violet light while maintaining the temperature below 50° C. until approximately 1 atom of chlorine per mole of dichlorodiethyl ether had been introduced. Thirteen moles of chlorine were passed into 12.8 moles of the dichlorodiethyl ether. The mixture was swept with nitrogen to remove hydrogen chloride and distilled at a pressure of 15 mm. of mercury. The fraction boiling at 84° C. was collected as alpha, beta, beta'-trichlorodiethyl ether. The distillation yielded 9.1 moles of alpha, beta, beta'-trichlorodiethyl ether, a yield of 74%. Higher chlorination products accounted for the remainder.

Example III

Two moles (287 grams) of beta, beta'-dichlorodiethyl ether were chlorinated at 15° C. by passing chlorine at the rate of 1.5 grams per minute into the liquid dichlorodiethyl ether for 4 hours. The weight increase indicated the introduction of one additional atom of chlorine per molecule of ether. Fractionation of the crude product through a column packed with glass helices, having an equivalent of 10 theoretical plates, using a reflux ratio of 9 to 1 and a pressure of 3 mm. of mercury yielded alpha, beta, beta'-trichlorodiethyl ether having a boiling range of 61.5 to 61.7° C. at 3 mm., a refractive index ($N_D^{25}$) of 1.4792, a density ($D_4^{27}$) of 1.3588, and a molecular refraction of 36.93 compared with the calculated value of 37.05. Chlorine analysis showed 59.66% chlorine compared with the calculated value of 59.93% chlorine.

Example IV

A 15 gram mole batch of beta, beta'-dichlorodiethyl ether was chlorinated at 30° C. while illuminated by a 4-watt "Daylight" fluorescent light. Chlorine gas was introduced at the rate of about 4 grams per minute. After 270 minutes the weight increase indicated the introduction of one additional atom of chlorine per molecule of ether. By infra-red analysis the product contained 92% of trichlorodiethyl ether, 5% of dichlorodiethyl ether and 3% of tetra and higher chlorodiethyl ethers.

I claim:
1. Alpha, beta, beta'-trichlorodiethyl ether.
2. A process for the production of alpha, beta, beta'-trichlorodiethyl ether which comprises chlorinating beta, beta'-dichlorodiethyl ether at a temperature within the range of about 10° to 50° C.

References Cited in the file of this patent

Beilstein, Erster Band, Vierte Auflage (1918), vol. 1, pp. 613 and 615.